(12) United States Patent
Kearney et al.

(10) Patent No.: US 6,934,550 B2
(45) Date of Patent: Aug. 23, 2005

(54) LOW LAYER PAGING INDICATOR PROCESSING SYSTEM AND METHOD FOR MULTI-LAYER COMMUNICATION EQUIPMENT USED IN A WIRELESS COMMUNICATION SYSTEM

(75) Inventors: Kenneth P. Kearney, Smithtown, NY (US); George W. McClellan, Bensalem, PA (US); Ryan E. Drummond, Eagleville, PA (US); Alan M. Levi, Swarthmore, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 186 days.

(21) Appl. No.: 10/400,878

(22) Filed: Mar. 27, 2003

(65) Prior Publication Data

US 2003/0186684 A1 Oct. 2, 2003

Related U.S. Application Data

(60) Provisional application No. 60/368,786, filed on Mar. 29, 2002.

(51) Int. Cl.$^7$ .................................................. H04Q 7/20
(52) U.S. Cl. .................................... 455/458; 455/426.1
(58) Field of Search .............................. 455/411, 422.1, 455/428, 432.1, 434, 445, 450, 455, 458, 426.1, 509, 560, 552.1, 553.1; 370/345, 347, 473

(56) References Cited

U.S. PATENT DOCUMENTS 6,138,034 A 10/2000 Willey et al. ................ 455/522
6,157,845 A 12/2000 Henry et al.
6,212,203 B1 4/2001 Anderson et al.
2004/0116126 A1 * 6/2004 Cave et al. .................. 455/450
2004/0176112 A1 * 9/2004 Beckmann et al. .......... 455/458

FOREIGN PATENT DOCUMENTS

EP 1069798 A 1/2001
WO 0152586 7/2001

OTHER PUBLICATIONS

Sophia Antipolis, Support of ANSI–41 Services in DS RRC Layer. UTRA Hooks and Extensions Workshop, Aug. 1999.
3 GPP TS 25.221 v.3.4.0, The Paging Indicator Channel (PICH), pp 25–26, Sep. 2000.
3 GPP TS 25.211 v.3.11.0, Paging Indicator Channel (PICH), pp. 34–35, 1999.
3 GPP TS 25.304 v.3.11.0, Paging and SCCPCH Selection, pp. 28–30, 1999.
3 GPP TS 25.331 v.3.12.0, Radio Resource Control (RRC) Protocol Specification, pp. 1–28, 63–64, 315–316, 456,462, 745–757 and 826, 826, 1999.

* cited by examiner

Primary Examiner—Benny Tieu
(74) Attorney, Agent, or Firm—Volpe and Koenig, P.C.

(57) ABSTRACT

A wireless communication system implements wireless communications between a base station and a plurality of User Equipments (UEs) including paging of UEs by initially processing paging indicator information. A first embodiment involves a UE's physical layer L1 being configured for interpreting a paging indicator (PI) to activate a preset decoding configuration to process paging data in a pre-specified paging channel (PCH). A second embodiment involves the physical layer control of a next higher level, L2, interpreting the paging indicator and configuring the physical layer L1 to process paging data in a pre-specified PCH.

11 Claims, 5 Drawing Sheets

LOW LAYER PAGING INDICATOR PROCESSING SYSTEM AND METHOD FOR MULTI-LAYER COMMUNICATION EQUIPMENT USED IN A WIRELESS COMMUNICATION SYSTEM

REFERENCE TO RELATED APPLICATION(S)

This application claims priority from U.S. Provisional Application No. 60/368,786, filed Mar. 29, 2002, which is incorporated herein by reference as if fully set forth.

FIELD OF INVENTION

This invention relates to improving the efficiency of paging processing in communication equipment used in a wireless communication system having multiple layers of processing such as a system designed in accordance with the present Third Generation Partnership Project (3GPP) specifications.

BACKGROUND

The popularity of wireless telecommunication has given rise to the recognition of physical limitations on available bandwidth and uniformity concerns. Accordingly, a need for standardization has permeated the telecommunications industry. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an interface known as IU which is defined in detail in the current publicly available 3GPP specification documents.

The UTRAN is configured to provide wireless telecommunication services to users through User Equipments (UEs) via a radio interface known as UU. The UTRAN has base stations, known as Node Bs in 3GPP, which collectively provide for the geographic coverage for wireless communications with UEs. In the UTRAN, groups of one or more Node Bs are connected to a Radio Network Controller (RNC) via an interface known as Iub in 3GPP. The UTRAN may have several groups of Node Bs connected to different RNCs, two are shown in the example depicted in FIG. 1. Where more than one RNC is provided in a UTRAN, inter-RNC communication is performed via an Iur interface.

Fundamental to 3GPP and the architecture of other relatively sophisticated systems is the adoption of a multi-layer structure such as the Open Systems International (OSI) seven layer model which was developed by the International Organization of Standardization (ISO).

The OSI model which is implemented through 3GPP systems has a physical layer in respective stations, base stations and user equipment, which actually transmits and receives the wireless telecommunication signals. The physical layer is commonly referred to as Layer 1 or L1. Other standard layers include a data link layer, Layer 2 (L2); a network layer, Layer 3 (L3); a transport layer, Layer 4 (L4); a session layer, Layer 5 (L5); a presentation layer, Layer 6 (L6); and an application layer, Layer 7 (L7). Through the layered hierarchy, communication information and data is conveyed over various predefined channels where the information is formatted and distributed through the functioning of the higher layers and then passed to the physical layer for actual transmission. The layered structure and associated channel definitions and data format structures as defined by 3GPP Technical Specifications provide for a highly sophisticated and relatively efficient data communication system.

One function implemented in 3GPP systems is paging. Under current 3GPP Technical Specification such as TS25.221 and TS25.331 V3.1.2.0, the paging function is implemented utilizing two different data signals namely, a Page Indication (PI) and substantive paging data. In accordance with current 3GPP specification, a PI is sent on a page indication channel (PICH) in advance of the substantive page data. That data is sent on a separate paging channel (PCH) which is transported by a Secondary Common Control Physical Channel (SCCPCH).

Since base stations are transmitting information for many UEs, the individual UEs only need to process that portion of the information being broadcast from the base stations that relates to that particular UE. In order to process paging data, a UE monitors a PICH until it receives an appropriate PI designated for that UE. After the appropriate PI signal is received by the UE, that UE then knows that substantive paging data is being sent for it on an associated PCH via an SCCPCH. Otherwise, the UE need not process paging data on the SCCPCH, such as paging data intended for a different UE.

To avoid the need for unnecessary processing of data intended for other UEs, the UEs physical layer, L1, is selectively instructed by the UEs higher layers as to which signals to process and the manner in which the signals are to be processed in accordance with the format of those signals. Much of the direct control of the physical layer is conducted by the data link layer, Layer 2, which in turn receives instructions and information from the network layer, Layer 3, which typically includes a radio resource control (RRC). The RRC provides information to the L1 control processing elements in Layer 2 to instruct the physical layer, L1, to process data received on specific channels such as a predefined SCCPCH.

In 3GPP systems, each SCCPCH has a specific format for transporting data which, as noted above, can include data for a paging channel (PCH). A base station may broadcast more than one paging channel with the use of multiple PICHs and PCHs. However, current 3GPP specifications dictate that only one PCH may be carried by a SCCPCH and that a unique PICH is defined for each PCH. Where multiple PICHs are being broadcast, the UEs make a determination as to which PICH it can monitor for a PI signal using a known algorithm as set forth in TS25.304 V3.11.0 Section 8.

Once the selection of which paging channel the UE should monitor is made, the RRC in level 3 directs the L1 control to instruct the physical layer to process signals received on the appropriate PICH. At that time, because there is a one-to-one correspondence with the PICHs and the PCHs, it is known which PCH and accordingly which SCCPCH is associated with the PICH which the physical layer has been instructed to monitor. Once the UE receives an appropriate PI over the PICH which it is monitoring, the physical layer L1 of the UE must be instructed to process the data on the SCCPCH which is carrying the associated PCH in order to process the associated paging data.

As shown in FIG. 2, conventional implementations have the PICH processed at the physical layer L1, but the decision to receive PCH is made by higher layers, typically within the RRC. Therefore, the processed paging indicator data is sent by L1 processing to the L1 Controller of L2 then on to the RRC in L3 which signals L1 processing via L1 Control of L2 to receive and process the PCH data if the paging indicator is positive. L1 Control is the Layer 2/3 interface to Layer 1.

For illustrative and comparative purposes, FIG. 2 shows a fairly typical example where there is a two frame gap between a PI and the corresponding paging data. The size of the gap is known in the radio link and transport channel (RL/TR) configuration for PCH reception.

As shown in FIG. 2, conventionally the physical layer L1 conducts chip processing of the received (RX) signal for each frame as it is received and then processes the received frames in accordance with the manner it has been configured by the L1 Controller of Layer 2. Thus, the physical layer L1 decodes the PI received on the PICH it is monitoring by the end of the received frame, Frame #1, in which the PI is contained. Implicit in FIG. 2, is that the physical layer L1 has been preconfigured by the L1 Controller to monitor the particular PICH based on instructions received from the RRC.

When decoded, the PI is sent by L1 to the physical layer Control processing unit of L2 which in turn requests new instructions from the RRC of L3 based on the decoded PI. The RRC then responds to the control processor of L2 instructing it to configure the physical layer L1 to process paging data from a specific PCH. The L2 processor in turn configures the physical layer for PCH to process paging data received on the specified PCH. This instruction process typically spans in time about one and one half frames, i.e. completely over Frame #2 which follows the frame in which the PI was received and into the next frame, Frame #3. The paging data is sent in the next frame, Frame #4, at which time the physical layer L1 has already been configured to receive the paging data in the selected PCH and follows those configuration instructions to process the paging data during Frame #5, i.e. after the conclusion of receipt/chip processing of the paging data in Frame #4.

The present inventors have recognized that the configuration of the physical layer L1 to process the paging data indicated by a PI can be performed more efficiently.

SUMMARY

The present invention comprises two different embodiments for processing of paging indicator information. The first embodiment involves the physical layer L1 being configured for interpreting the paging indicator PI to activate a preset decoding configuration to process paging data in a pre-specified PCH. The second embodiment involves the physical layer control of L2 interpreting the paging indicator and configuring the physical layer L1 to process paging data in a pre-specified PCH.

Generally, a wireless communication system implements wireless communications between a base station and a plurality of User Equipments (UEs) including paging of UEs. Preferably, the UEs are constructed with a multi-layer processing system having a configurable lowest physical layer L1 which receives wireless communication signals and selectively processes the received signals according to its then present configuration. Preferably, the UEs have a first higher level L2 that includes a physical layer processing control for reconfiguring the physical layer L1, and a second higher layer L3 that includes a radio resource control (RRC) for providing the L2 physical layer processing control with paging channel parameters.

As in the prior art, a paging indicator (PI) is received by a UE in advance of corresponding paging data and the UE is configured to process the paging data after receiving the PI.

The invention provides a UE with a low level buffer for storing predetermined paging data processing configuration data. The UE's first higher level L2 is associated with the UE's RRC such that, when a specific PI that is determined by the UE's RRC is identified to the UE's first higher level L2, the UE's physical layer L1 is configured to monitor for the specific PI. In conjunction with this, corresponding paging data processing configuration data is stored in the buffer. The UE's physical layer L1 is associated with the UE's L2 physical layer processing control such that, when the UE's physical layer L1 identifies that the specific PI has been received, the UE's physical layer L1 is thereafter configured to process paging data based on the paging data processing configuration data stored in the buffer without communication with the RRC or other components of higher layers, i.e. higher than L2.

Preferably the UE lower layer buffer is a physical layer buffer within the UE's physical layer L1 for storing predetermined paging data processing configuration data. The UE's physical layer L1 is then associated with the UE's L2 physical layer processing control such that, when the UE's physical layer L1 is configured to monitor for reception of a specific PI that is determined by the UE's RRC, corresponding paging data processing configuration data is stored in said physical layer buffer. At that time the UE's physical layer L1 is also configured to access the buffer and use the stored data to reconfigure itself upon receiving and processing the specific PI. For a 3GPP system, the physical layer L1 is configured to monitor a specific page indication channel (PICH) when it is configured to monitor for the specific PI and the physical layer L1 is configured to monitor a specific separate paging channel (PCH) which is transported by a Secondary Common Control Physical Channel (SCCPCH) when it is configured to process the corresponding paging data.

Alternatively, the UE lower layer buffer is a physical layer processing control buffer within the UE's first higher level L2 for storing predetermined paging data processing configuration data. The UE's first higher level L2 is then associated with the UE's RRC such that, when a specific PI that is determined by the UE's RRC is identified to the UE's first higher level L2, corresponding paging data processing configuration data is stored in said physical layer processing control buffer. The UE's physical layer L1 is then associated with the UE's L2 physical layer processing control such that, when the UE's physical layer L1 identifies to the UE's first higher level L2 that the specific PI has been received, the UE's physical layer L1 is configured to process corresponding paging data by the UE's L2 processing control based on the paging data processing configuration data stored in the physical layer processing control buffer. Where the UE is for a 3GPP system, the physical layer L1 is configured to monitor a specific page indication channel (PICH) when it is configured to monitor for the specific PI and the physical layer L1 is configured to monitor a specific separate paging channel (PCH) which is transported by a Secondary Common Control Physical Channel (SCCPCH) when it is configured to process the corresponding paging data.

Other objects and advantages of the present invention will be apparent to those skilled in the art from the following detailed description and the drawings.

BRIEF DESCRIPTION OF THE DRAWING(S)

DETAILED DESCRIPTION OF THE PREFERRED EMBODIMENTS

Figure 1:
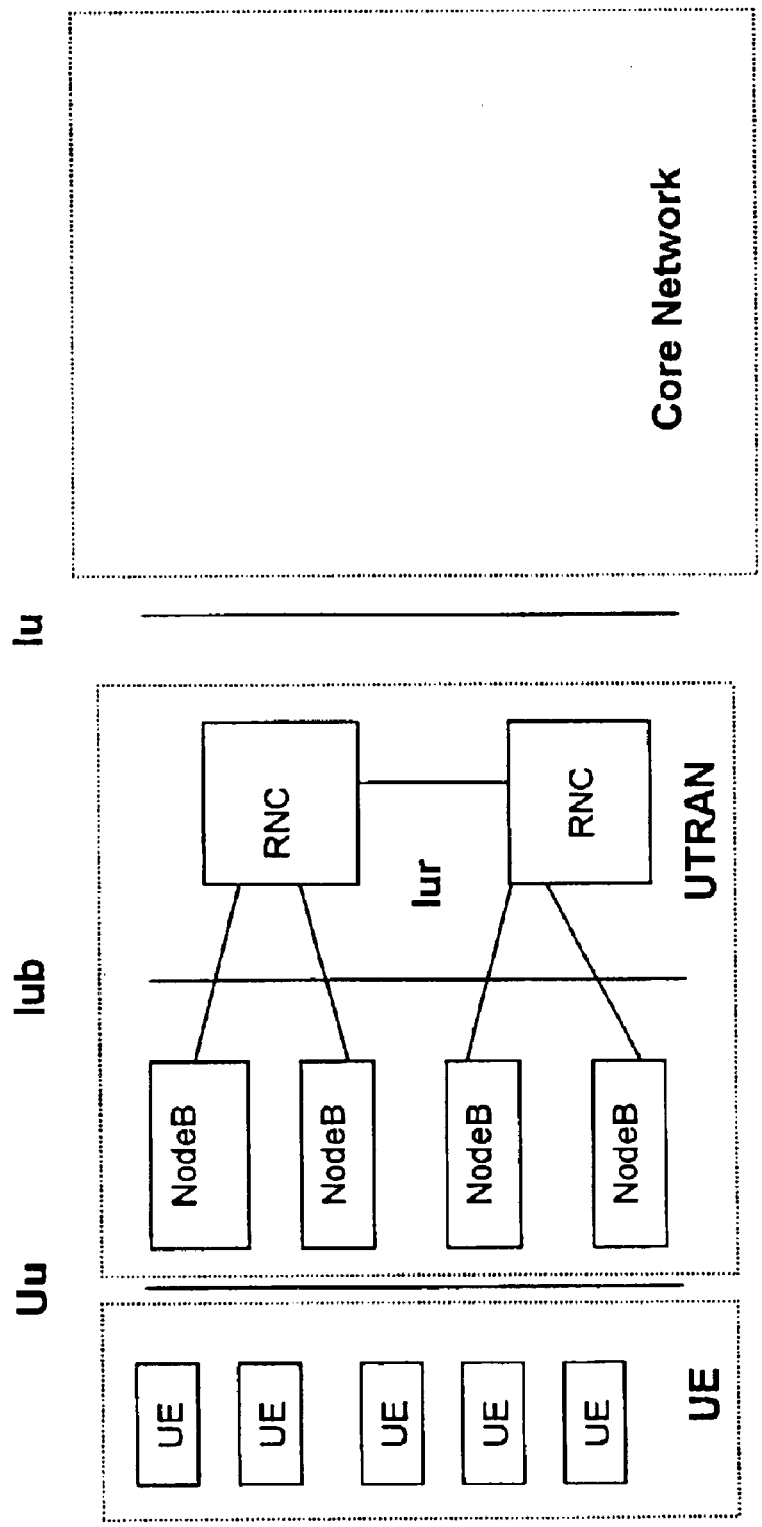
FIG. 1 is a schematic diagram of a typical UMTS system in accordance with current 3GPP specifications.
Figure 4B:
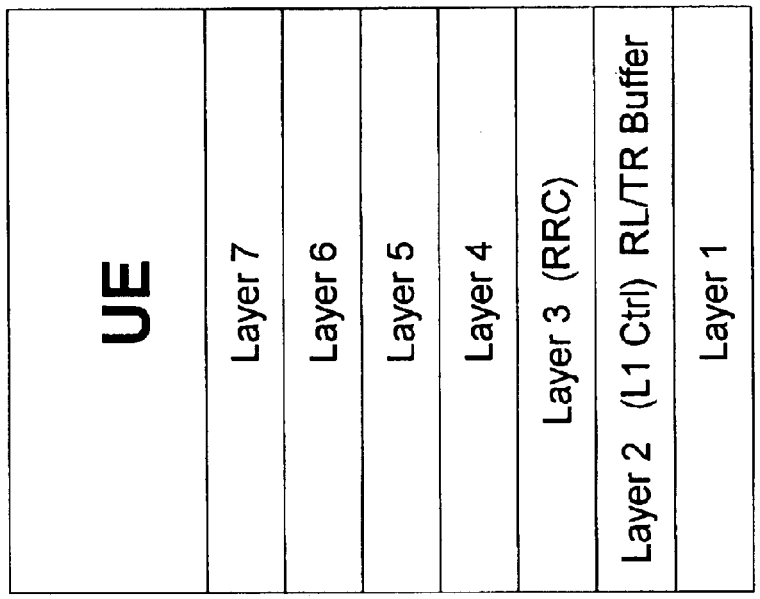
FIG. 4b is a representative illustration of a UE configured to implement the second embodiment of the present invention.

A User Equipment (UE) is provided for use in a wireless communication system, such as illustrated in FIG. 1, which implements wireless communications between a base station and a plurality of UEs including paging of UEs. The UEs are constructed with a multi-layer processing system, preferably a seven layer system as depicted in FIGS. 3b and 4b. A configurable lowest physical layer L1 receives wireless communication signals and selectively processes the received signals according to its then present configuration. Preferably, a first higher level, L2, includes a physical layer processing control for reconfiguring the physical layer L1, and a second higher layer, L3, includes a radio resource control (RRC) for providing the L2 physical layer processing control with paging channel parameters.

Preferably, the system initiates paging by a base station transmitting a paging indicator (PI) on a page indication channel (PICH) in advance of the substantive page data in accordance with current 3GPP specifications. Current 3GPP specifications specify that the page data is sent on a separate paging channel (PCH) which is transported by a Secondary Common Control Physical Channel (SCCPCH) with a 2, 4 or 8 frame gap from the transmission of the PI. The PI is received by the UE in advance of corresponding paging data and the UE is configured to process the paging data after receiving the PI.

Figure 3A:
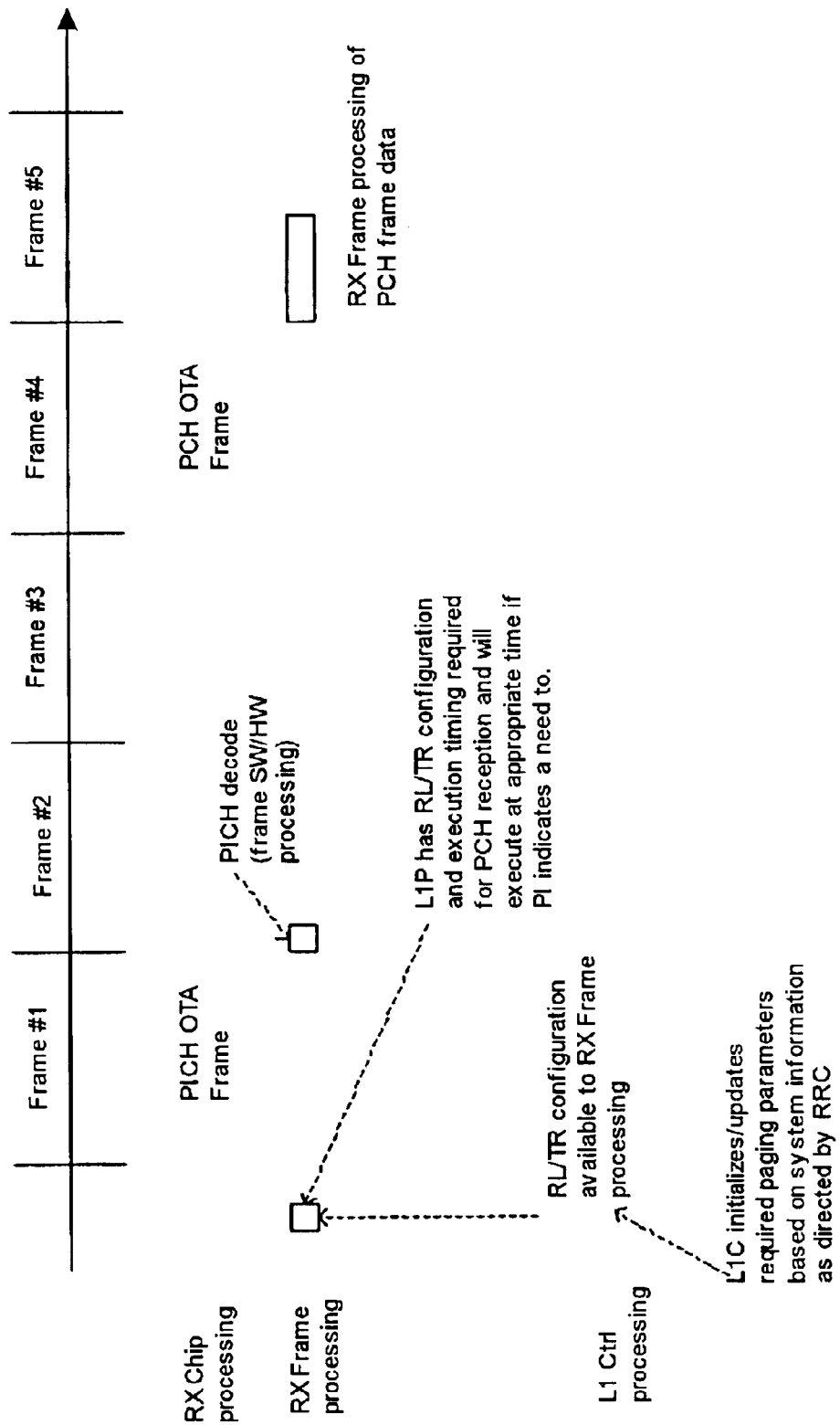
FIG. 3a is a timing diagram of a first embodiment for paging indicator processing in accordance with the present invention.
Figure 3B:
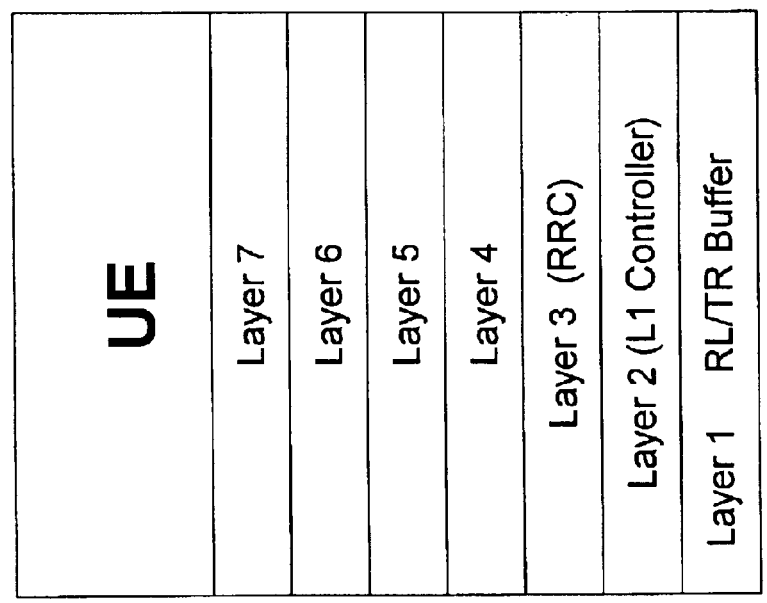
FIG. 3b is a representative illustration of a UE configured to implement the first embodiment of the present invention.

A first embodiment of the invention is to provide a user equipment (UE) with a system for paging indicator (PI) and related paging data processing where the UE's physical layer L1 processing interprets the paging indicator as illustrated in FIGS. 3a and b. To implement this, the UE's physical layer L1 includes a buffer in which the radio link and transport channel (RL/TR) configuration for PCH reception is stored when the physical layer L1 is configured to monitor a corresponding PICH for receipt of a specified PI. The pre-configuration of the physical layer L1 to monitor a particular PICH for receipt of a specified PI includes instructions to the physical layer to automatically reconfigure itself in accordance with the data stored in the buffer when the specified PI is received and decoded. This embodiment reduces unnecessary interlayer signaling since the required configuration information is available to L1 processing based on system information previously processed by higher layers at the time it is configured to monitor for a specified PI. Accordingly, the invention reduces unnecessary power consumption since higher layer processors can remain in a powered down state while L1 processes the PI to determine if there is a need for the UE to receive the PCH in a given DRX cycle. Conservation of power is significant for a UE since many UEs are battery powered and battery life can be considerably shortened by frequently powering processing components for higher layers.

Figure 2:
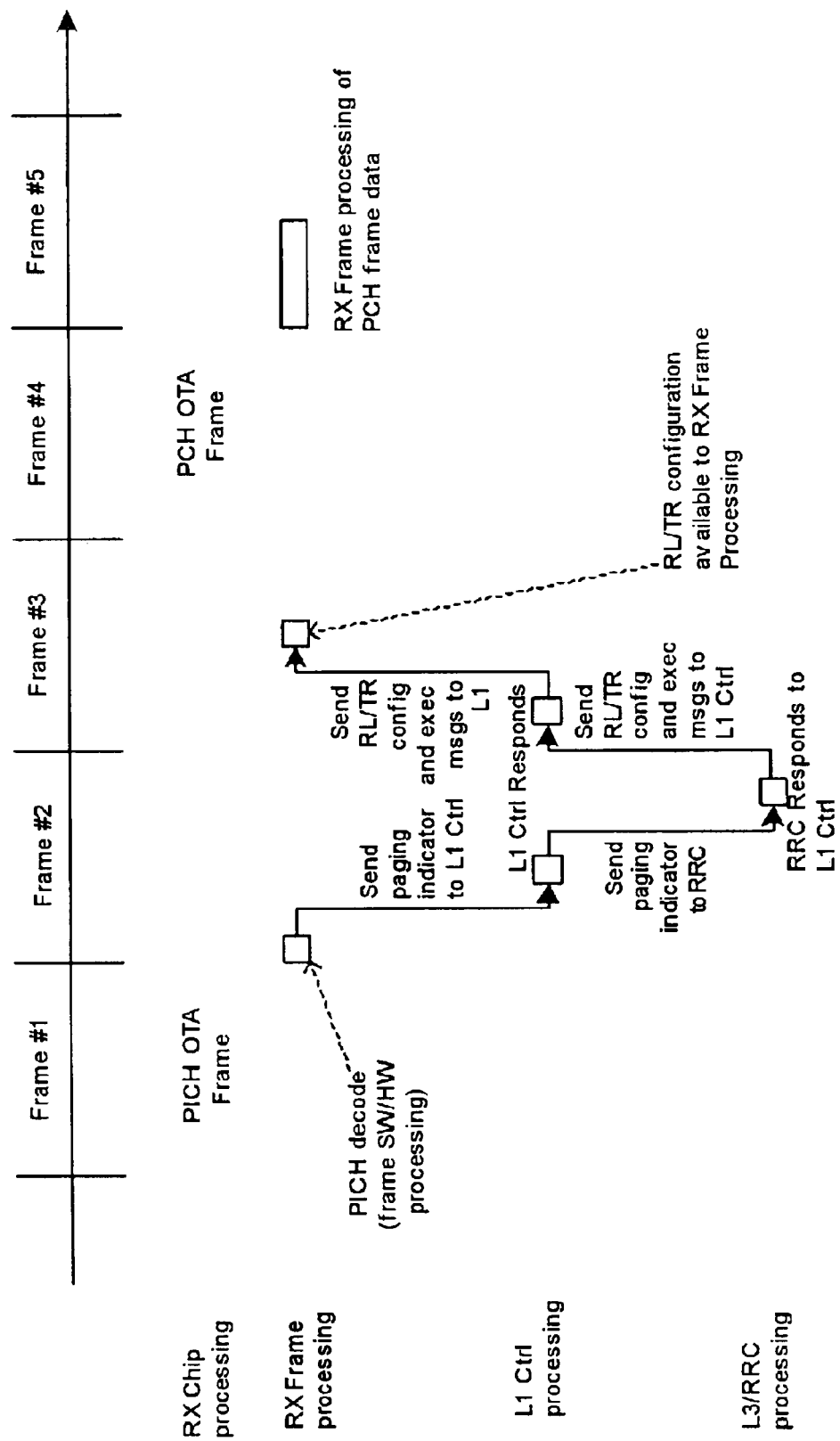
FIG. 2 is a timing diagram of a prior art scheme for paging indicator processing.

As with the conventional system shown in FIG. 2, in the embodiment of the invention shown in FIGS. 3a and b, the physical layer L1 conducts chip processing of the received (RX) signal for each frame as it is received and then processes the received frames in accordance with the manner it has been configured by the L1 Controller of Layer 2. Thus, the physical layer L1 decodes the PI received on the PICH it is monitoring by the end of the received frame, Frame #1, in which the PI is contained. Implicit in FIG. 2, is that the physical layer L1 has been preconfigured by the L1 Controller to monitor the particular PICH based on instructions received from the RRC. However, unlike the conventional system, the UE is configured such that the PCH processing configuration is stored in a physical layer L1 buffer for use when the specified PI is decoded by the physical layer. Accordingly, when decoded, the PI triggers the physical layer L1 to automatically assume the configuration required for processing the corresponding paging data which is to be received on the corresponding PCH, instead of the PI being sent by L1 to the physical layer Control processing unit of L2 which in turn would request new instructions from the RRC of L3.

In addition to eliminating excessive interlayer signaling, the invention makes it possible to advance the transmission and receipt of the corresponding paging data. As with the prior art, a UE embodying the present invention can receive a PI in Frame #1 and be ready for reception of the corresponding paging data in the PCH in Frame #4 for processing in Frame #5. However, the present invention also enable the UE to receive a PI in Frame #1 and be ready for reception of the corresponding paging data in the PCH in Frame #3 for processing in Frame #4. Accordingly, if current 3GPP specifications are amended to permit a one frame gap between the PI and the paging data such a faster paging process can be accommodated without modifying the UE but merely providing the appropriate data to the buffer to process the PCH and page data in an earlier frame time period.

Figure 4A:
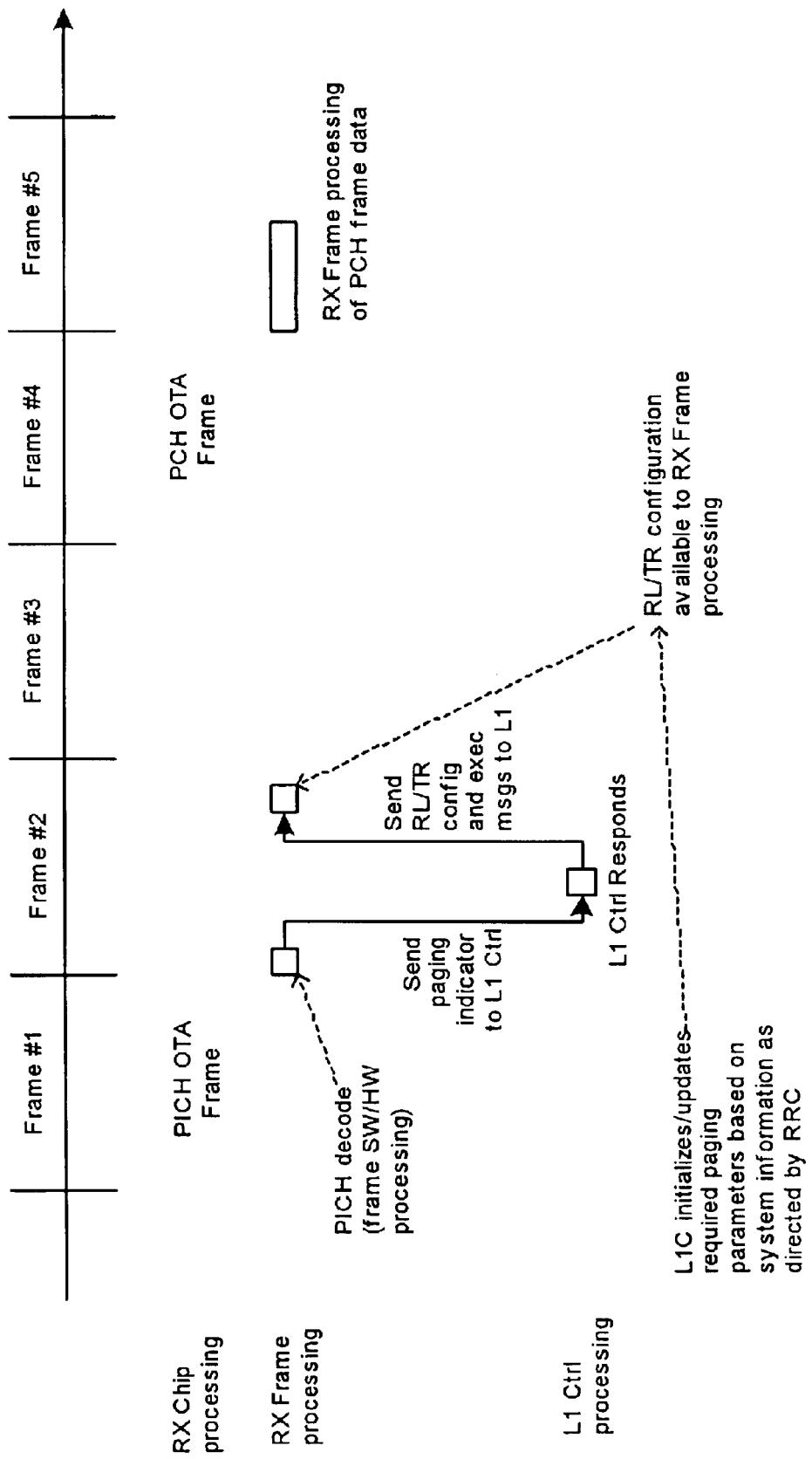
FIG. 4a is a timing diagram of a second embodiment for paging indicator processing in accordance with the present invention.

A second embodiment of the invention is to provide a user equipment (UE) with a system for paging indicator (PI) and related paging data processing where the UE's physical layer L1 Controller of L2 interprets the paging indicator as illustrated in FIGS. 4a and b. To implement this, the UE's physical layer L1 Controller has an associated L2 buffer in which the radio link and transport channel (RL/TR) configuration for PCH reception is stored when the L1 Controller is instructed to configure the physical layer L1 to monitor a corresponding PICH for receipt of a specified PI. Preferably, the UE is configured with a Radio Resource Controller (RRC) in level 3, that provides the parameters and other information to the Controller of L2.

When the RRC instructs the L1 Controller of L2 to configure the physical layer L1 to monitor a particular PICH for receipt of a specified PI, the L2 buffer receives the parameters necessary to instruct to the physical layer L1 how to be configured to receive the corresponding page data which will be received on the corresponding PCH after receipt of the specified PI. Accordingly, when the physical layer L1 decodes the PI, the PI is sent the L1 Controller of L2 which then uses the data stored in the L2 buffer to directly instruct the physical layer L1 how to be configured for processing the corresponding paging data which is to be received on the corresponding PCH without requesting further instructions from the RRC of L3.

This embodiment also reduces unnecessary interlayer signaling since the required configuration information is available to L1 Controller of L2 based on system information previously processed by higher layers at the time it receives the parameters needed to configure the physical layer L1 to monitor for a specified PI. In particular signaling to and from the RRC is reduced.

While both embodiments are viable, the first embodiment is faster than the second embodiment. However, there is some logic and buffering required in the first embodiment that would normally be done above the L1 processing layer when time permits. There is benefit in processing time, reduced signaling and reduced power consumption if L1 processing performed in the first embodiment interprets the paging indicator and makes the decision for reception of the PCH channel data. Similar benefits, except no reduction in power consumption, would be realized for the second embodiment.

It should also be understood that the present invention can be fully implemented as a software module. In such a case, the module is easily adaptable to changes desired by the system administrator. For example, certain easy functions described hereinbefore as being implemented in L1 processing may be implemented by L1 control and vice versa.

What is claimed is:

1. In a wireless communication system which implements wireless communications between a base station and a plurality of User Equipments (UEs) including paging of UEs wherein the UEs are constructed with a multi-layer processing system having a configurable lowest physical layer L1 which receives wireless communication signals and selectively processes the received signals according to its then present configuration, a first higher level L2 that includes a physical layer processing control for reconfiguring the physical layer L1, and a second higher layer L3 that includes a radio resource control (RRC) for providing the L2 physical layer processing control with paging channel parameters and wherein a paging indicator (PI) is received by a UE in advance of corresponding paging data and the UE is configured to process the paging data after receiving the PI, a UE comprising:

a physical layer buffer within the UE's physical layer L1 for storing predetermined paging data processing configuration data wherein the UE's physical layer L1 is associated with the UE's L2 physical layer processing control such that, when the UE's physical layer L1 is configured to monitor for reception of a specific PI that is determined by the UE's RRC, corresponding paging data processing configuration data is stored in said physical layer buffer and the UE's physical layer L1 is configured to access said buffer and use the stored data to reconfigure itself upon receiving and processing the specific PI.

2. In a wireless communication system which implements wireless communications between a base station and a plurality of User Equipments (UEs) including paging of UEs wherein the UEs are constructed with a multi-layer processing system having a configurable lowest physical layer L1 which receives wireless communication signals and selectively processes the received signals according to its then present configuration, a first higher level L2 that includes a physical layer processing control for reconfiguring the physical layer L1, and a second higher layer L3 that includes a radio resource control (RRC) for providing the L2 physical layer processing control with paging channel parameters and wherein a paging indicator (PI) is received by a UE in advance of corresponding paging data and the UE is configured to process the paging data after receiving the PI, a UE comprising:

a buffer for storing predetermined paging data processing configuration data wherein the UE's first higher level L2 is associated with the UE's RRC such that, when a specific PI that is determined by the UE's RRC is identified to the UE's first higher level L2 and the UE's physical layer L1 is configured to monitor for the specific PI, corresponding paging data processing configuration data is stored in said buffer and wherein the UE's physical layer L1 is associated with the UE's L2 physical layer processing control such that, when the UE's physical layer L1 identifies that the specific PI has been received and processed, the UE's physical layer L1 is configured to process paging data based on the paging data processing configuration data stored in said buffer without communication with the RRC.

3. The UE according to claim 2 wherein:

the buffer is a physical layer buffer within the UE's physical layer L1 for storing predetermined paging data processing configuration data; and the UE's physical layer L1 is associated with the UE's L2 physical layer processing control such that, when the UE's physical layer L1 is configured to monitor for reception of a specific PI that is determined by the UE's RRC, corresponding paging data processing configuration data is stored in said physical layer buffer and the UE's physical layer L1 is configured to access said buffer and use the stored data to reconfigure itself upon receiving and processing the specific PI.

4. The UE according to claim 3 wherein the physical layer L1 is configured to monitor a specific page indication channel (PICH) when it is configured to monitor for the specific PI and the physical layer L1 is configured to monitor a specific separate paging channel (PCH) which is transported by a Secondary Common Control Physical Channel (SCCPCH) when it is configured to process the corresponding paging data.

5. The UE according to claim 2 wherein:

the buffer is a physical layer processing control buffer within the UE's first higher level L2 for storing predetermined paging data processing configuration data;

the UE's first higher level L2 is associated with the UE's RRC such that, when a specific PI that is determined by the UE's RRC is identified to the UE's first higher level L2, corresponding paging data processing configuration data is stored in said physical layer processing control buffer; and the UE's physical layer L1 is associated with the UE's L2 physical layer processing control such that, when the UE's physical layer L1 identifies to the UE's first higher level L2 that the specific PI has been received and processed, the UE's physical layer L1 is configured to process corresponding paging data by the UE's L2 processing control based on the paging data processing configuration data stored in said physical layer processing control buffer.

6. The UE according to claim 5 wherein the physical layer L1 is configured to monitor a specific page indication channel (PICH) when it is configured to monitor for the specific PI and the physical layer L1 is configured to monitor a specific separate paging channel (PCH) which is transported by a Secondary Common Control Physical Channel (SCCPCH) when it is configured to process the corresponding paging data.

7. In a wireless communication system which implements wireless communications between a base station and a plurality of User Equipments (UEs) including paging of UEs wherein the UEs are constructed with a multi-layer processing system having a configurable lowest physical layer L1 which receives wireless communication signals and selectively processes the received signals according to its then present configuration, a first higher level L2 that includes a physical layer processing control for reconfiguring the physical layer L1, and a second higher level L3 that includes a radio resource control (RRC) for providing the L2 physical layer processing control with paging channel parameters and wherein a paging indicator (PI) is received by a UE in advance of corresponding paging data and the UE is configured to process the paging data after receiving the PI, a paging processing method comprising:

providing a UE buffer for storing predetermined paging data processing configuration data;

using the UE's RRC to determine a specific PI for the UE to monitor;

identifying the specific PI to the UE's first higher level L2 and using the L2 physical layer processing control to configure the UE's physical layer L1 to monitor for the specific PI in conjunction with storing corresponding paging data processing configuration data in said buffer; and when the UE's physical layer L1 identifies that the specific PI has been received by the UE, configuring the UE's physical layer L1 to process paging data based on the paging data processing configuration data stored in said buffer without communication with the RRC.

8. The UE according to claim 7 wherein:

the provided buffer is a physical layer buffer within the UE's physical layer L1 for storing predetermined paging data processing configuration data;

when the UE's physical layer L1 is configured to monitor for reception of a specific PI that is determined by the UE's RRC, corresponding paging data processing configuration data is stored in said physical layer buffer and the UE's physical layer L1 is configured to access said buffer and use the stored data to reconfigure itself to process corresponding paging data upon receiving and processing the specific PI.

9. The method according to claim 8 wherein the physical layer L1 is configured to monitor a specific page indication channel (PICH) when it is configured to monitor for the specific PI and the physical layer L1 is configured to monitor a specific separate paging channel (PCH) which is transported by a Secondary Common Control Physical Channel (SCCPCH) when it is configured to process the corresponding paging data.

10. The method according to claim 7 wherein:

the provided buffer is a physical layer processing control buffer within the UE's first higher level L2 for storing predetermined paging data processing configuration data;

when the specific PI is identified to the UE's first higher level L2, corresponding paging data processing configuration data is stored in said physical layer processing control buffer; and when the UE's physical layer L1 identifies that the specific PI has been received by the UE, the UE's physical layer L1 identifies to the UE's first higher level L2 that the specific PI has been received and the UE's physical layer L1 is configured to process corresponding paging data by the UE's L2 processing control based on the paging data processing configuration data stored in said physical layer processing control buffer.

11. The method according to claim 10 wherein the physical layer L1 is configured to monitor a specific page indication channel (PICH) when it is configured to monitor for the specific PI and the physical layer L1 is configured to monitor a specific separate paging channel (PCH) which is transported by a Secondary Common Control Physical Channel (SCCPCH) when it is configured to process the corresponding paging data.

* * * * *